United States Patent [19]

Hume

[11] 4,167,951
[45] Sep. 18, 1979

[54] WATER SAVING ATTACHMENT FOR CONTROL VALVE FLOAT IN TOILET FLUSH TANK

[76] Inventor: Floyd D. Hume, 223 Bedford, Gardner, Kans. 66030

[21] Appl. No.: 813,321

[22] Filed: Jul. 6, 1977

[51] Int. Cl.² .................. F16K 33/00; E03D 1/33
[52] U.S. Cl. ............................. 137/426; 4/415; 4/DIG. 1; 73/322.5
[58] Field of Search ........... 4/57 R, 57 P, 53, 67 A, 4/34, 56, 415, DIG. 1, 391, 394, 403, 366; 137/410, 426, 409, 397, 398; 73/322.5

[56] References Cited
U.S. PATENT DOCUMENTS 1,177,963 4/1916 Peterson .................... 137/426

FOREIGN PATENT DOCUMENTS 50572 8/1935 Denmark.

Primary Examiner—Richard E. Aegerter
Assistant Examiner—Willis Little

[57] ABSTRACT

A water saving float attachment for use with a water closet or toilet tank having float operated control valve means for regulating the liquid level in the tank, a hollow ball float, and rod means operatively conecting the float with the control valve means; said float attachment being adapted to be applied to the external surface of the hollow ball float, and having a density less than that of the liquid in the tank. Said attachment, when applied to the hollow float, has an effective diameter substantially greater than that of the uncovered float, whereby, when the attachment is applied to the float, the liquid in the tank will be maintained substantially lower level than the liquid level when the hollow float alone is employed.

7 Claims, 4 Drawing Figures

U.S. Patent    Sep. 18, 1979    4,167,951
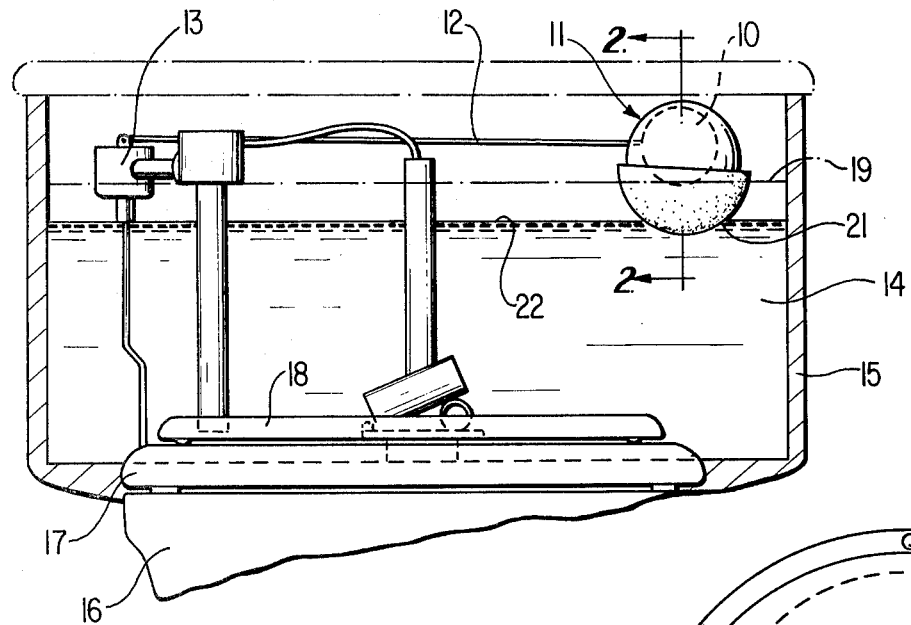
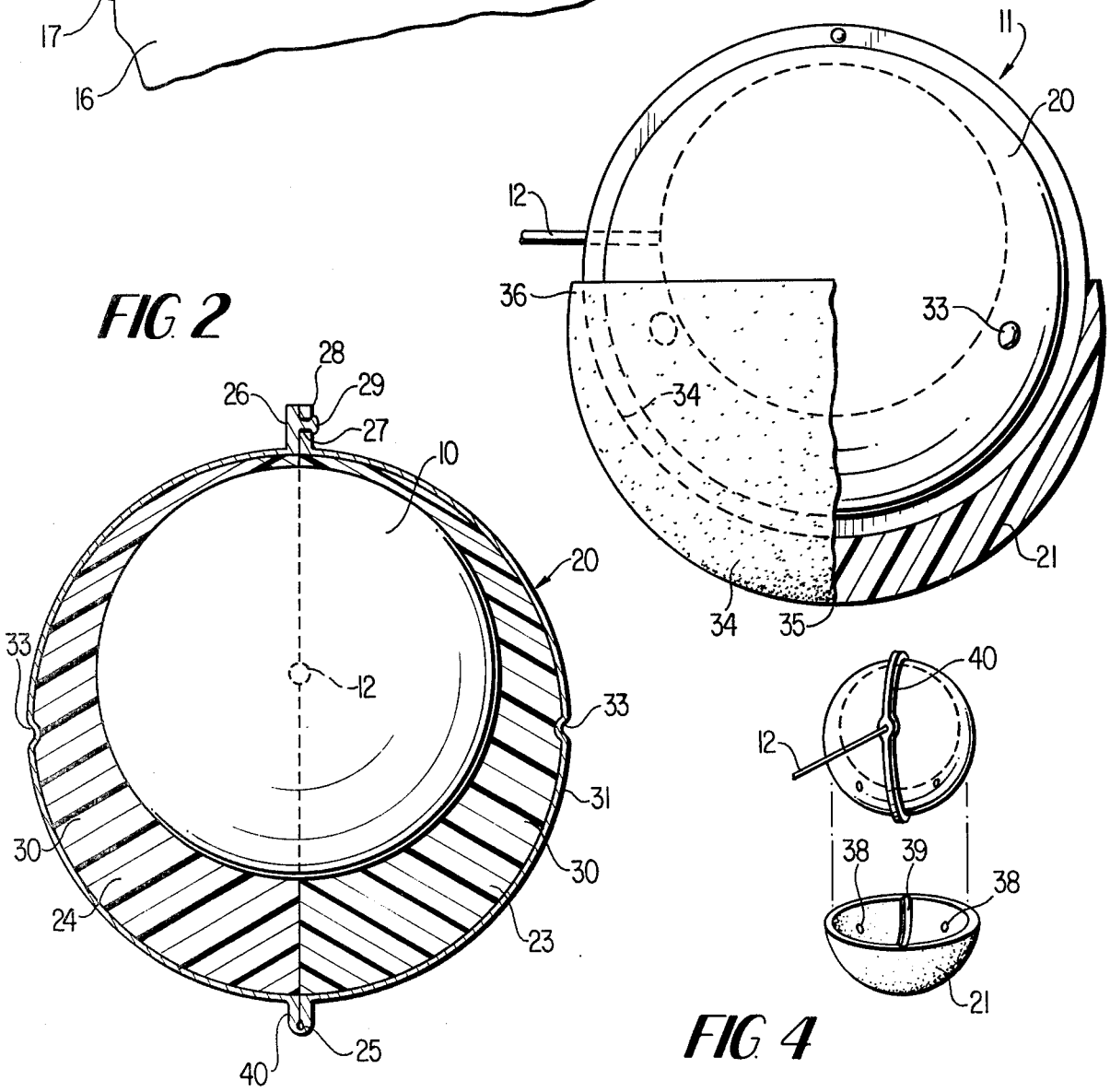

WATER SAVING ATTACHMENT FOR CONTROL VALVE FLOAT IN TOILET FLUSH TANK

BACKGROUND OF THE INVENTION AND PRIOR ART

The importance of providing means for adjusting the liquid cutoff level in a water closet or toilet flush tank, in order to save water, has long been recognized, and various mechanisms designed to accomplish this effect are known including the following U.S. Pat. Nos.: 1,177,963 Peterson Apr. 4, 1916, 3,298,231 Zukley Jan. 17, 1967, 3,331,307 Walters July 18, 1967, 3,385,317 Yankers May 28, 1968.

None of the above patents disclose the use of a buoyant casing or cover applied to the usual ball-type float for the water control valve in order to reduce the water level in the tank at which the water cutoff takes place as compared to the level using the uncovered float.

SUMMARY OF THE INVENTION

The invention relates to an attachment for a ball-type float for controlling a toilet flush valve.

The ordinary float is a hollow metal ball located in the flush tank and attached to a control valve by a suitable rod. Such float control operation mechanism is well known and may be of any suitable or well known construction. Such device is shown, for example, in U.S. Pat. Nos. 3,385,317, in Huso 3,087,168, dated Apr. 30, 1963, and need not be described in detail since the invention relates to the attachment for the hollow ball float rather than to the specific construction of the operating mechanism.

The flush valve and associated mechanism, including a ball-type float are generally made of standard sizes and accordingly the float controlled valve will fill the flush tank to a predetermined level before cutting off. In view of the importance of saving water under present conditions, particularly in drought areas, it may be desirable to reduce the amount of water accumulating in the flush tank making use of the present standard equipment. This can be done in accordance with my invention by increasing the effective diameter of the valve float.

In accordance with my invention, I provide a readily attachable cover for the float formed of suitable foam plastic material such as foam rubber or polyurethane foam. The cover may be of clam shell-shaped design, including a hinge portion and any suitable snap fastening means such, for example, as used in fastening plastic boxes or old fashioned pocketbooks.

The hinged float plastic cover or primary attachment may be protected by a non-porous waterproof skin or covering of any suitable material, as for example, natural or synthetic rubber. This waterproof covering may be adhered to the inner plastic foam or body portion by any suitable adhesive composition such as an epoxy resin. The large volume foam plastic covered float, with an over-all density substantially less than that of water, will cut off water in the tank sooner than a smaller diameter uncovered float, thus saving water when the toilet bowl is flushed.

If a greater saving of water is desired, the float may be supported in a plastic foam bowl or secondary attachment which increases the effective diameter of the float.

I choose to call the plastic covered float a SAV-A-FLUSH and when accompanied by the plastic foam bowl, I choose to call it a SUPER SAV-A-FLUSH.

The plastic foam covered float may be used either with or without the plastic foam bowl, and the bowl may be used either with an uncovered hollow ball float or with a foam covered float.

The invention will be more fully understood by reference to the accompanying drawings and following detailed description.

BRIEF DESCRIPTION OF THE DRAWINGS

In the drawings:

FIG. 1 is a view partly in vertical section and partly in elevation showing a preferred embodiment of the invention in operative association with a conventional toilet or water closet tank, a portion of the toilet seat being shown.

FIG. 2 is a sectional view on an enlarged scale on line 2,2 of FIG. 1 through the plastic foam covered float only, the plastic foam bowl or secondary attachment being omitted in this figure.

FIG. 3 is a view partly in section and partly in elevation taken at right angles to FIG. 2 but including also the plastic foam bowl or secondary attachment shown partly broken away.

FIG. 4 is an exploded perspective view showing the inner hollow ball float covered with the primary foam attachment member, the inner float being shown attached to a portion of the rod connecting the float to the liquid level control valve and showing separately the secondary foam member or bowl, below the foam covered float.

PREFERRED EMBODIMENT

In FIG. 1, a conventional ball-type hollow float 10 is shown to which my improved attachment 11, composed of suitable plastic foam material such as foam rubber or polyurethane foam having a waterproof skin or casing, is applied. The float 10 is attached by the usual connecting rod 12 to conventional control valve mechanism 13, which automatically regulates the level of the water 14 within a flush tank 15 of a conventional toilet represented fragmentarily by a bowl 16 having the usual hinged seat members 17 and 18. The operation of the float controlled valve 13 is well known and need not be further described. Various such mechanisms are known and are shown, for example, in Yankers U.S. Pat. No. 3,385,317, dated May 28, 1968, and in Huso U.S. Pat. No. 3,087,168, previously referred to.

Referring particularly to FIG. 1, if the usual uncased hollow ball float 10 is employed, the water level would be that indicated by the dot and dash line 19. However, by the use of my attachment 11, which may include both a primary foam member 20 of clam shell design and a secondary bowl shaped member 21, also of plastic foam material, such as foam rubber or polyurethane foam, the effective diameter of the attachment will be increased so that the water level will occupy the position shown at 22, thus effecting a saving of the water indicated by the difference in the levels 19 and 22.

Referring particularly to FIG. 2, the primary attachment member 20 is shown as comprising two clam shell-shaped body portions or halves 23,24 hinged at 23 and so shaped as to fit snugly about the inner ball or float member 10 which, as previously set forth, is connected to the control valve 13 by the connecting rod 12. As shown, the two halves 23,24 of the primary member 20 are provided with flanges 26,27 having suitable snap fastening means 28,29 for readily securing the two portions together. Other suitable fastening means than those shown may be used if desired.

The hollow float 10 may be of conventional foam and is shown as a round ball, preferably of metal but may be of other suitable relatively rigid, liquid-impervious material such as rigid plastic or hard rubber.

The hinged primary foam member 20 is of substantially less density than that of the liquid (water) 14 in the flush tank 15, and the two portions or halves 23,24 are so shaped and arranged as to be readily snapped over the inner ball member 10 without interference of float arm member 12. To this end the two halves 23,24 lie in the same plane as the float arm 12 in a preferred embodiment. The thickness of the primary float attachment 20 tapers from about 1" adjacent the hinge portion 25 to a lesser thickness adjacent the snap portion 28,29.

The primary member 20 is shown in FIG. 2 as comprising a foam body portion 30, and an impervious skin or casing 31 which may be of any suitable material such as flexible rubber or plastic and may be adhered to the body portion by means of an adhesive composition 32 such as epoxy resin. If for any reason, it is desired to permanently adhere the primary foam member 20 to the inner ball member 10, an epoxy resin composition may also be used. Dimples 33,33 may be provided to aid in the attachment of the bowl shaped secondary member 21 as will be more readily understood by reference to FIGS. 3 and 4 in which the secondary bowl portion member 21 is shown (a) applied to the primary member 20 in FIG. 3, and (b) separated from the primary number in FIG. 4.

The secondary foam member 21 preferably comprises a bowl-shaped body portion 34 of foam material similar to the body portion 32 of the primary member 20, such as foam rubber or polyurethane foam, and is preferably provided both inside and out with an impervious skin or casing 35, and is shaped to snugly fit over the lower portion of the primary member 20 as illustrated in FIG. 3. The secondary float member 21 is shown as of maximum thickness at its lower portion 36 and is tapered at its upper portion 37.

As shown in FIG. 4, the bowl shaped member 21 is provided with small projections or bumps 38 adapted to fit over the dimples 33 formed in the primary member 20. Also the secondary member 21 may be provided with a semi-circular groove 39 adapted to fit over an external flange portion 40 of the primary member 20 (FIGS. 2 and 4). The bowl shaped member 21 is resilient and is adapted to fit snugly over the external surface of the primary member 20.

Since the bowl shaped member 21 is of low density, it will float on the surface of the liquid 14 in the flush tank 15 and may be used to support an uncovered ball 10 without the use of a primary member 20 and will serve to increase the effective diameter of the ball float. Any number of such ball float members may be employed of different sizes to increase the effective diameter of the float.

Operation

The operation of the device will be largely apparent from the foregoing description since such operation is the same as that of the ordinary ball float except that the effective diameter of the float may be increased to any desired extent by the use of one or more primary and/or secondary foam attachment members of any suitable thickness and adapted to fit one within the other or to be used separately. The primary member 20 may be readily attached to the exterior of the ball float 10 and, unless permanently adhered thereto, it may be readily removed to allow the ball float to function alone or one cover may be replaced by another of different thickness or a number of covers may be employed. Similarly, the secondary or bowl shaped member 21 may be of any desired thickness and may be used with a covered or uncovered float. Any desired number of such bowl shaped members may be employed and may be arranged to fit one within another.

The invention has been described in detail for the purpose of illustration, but it will be obvious that numerous modifications and variations may be resorted to without departing from the spirit of the invention in its broadest aspects.

What is claimed is:

1. A water saving device for use with a water closet or toilet tank having float operated control valve means for regulating the liquid level in the tank, a hollow ball float, and rod means operatively connecting the float with the control valve means, which comprises an attachment for the external surface of the hollow float having a density less than that of the liquid in the tank which, when applied to the hollow float, has an effective diameter substantially greater than that of the uncovered float, whereby, when the attachment is applied to the float, the liquid in the tank will be maintained at a substantially lower level than the liquid level when the hollow float alone is employed, said control float valve attachment comprising a hinged cover adapted to be snapped over said float.

2. An attachment as defined in claim 1 wherein the hinged cover is provided with a detachable connecting means.

3. An attachment as defined in claim 1, comprising an inner or body portion of foam plastic and a liquid impervious outer cover.

4. A device as defined in claim 2 wherein secondary float attachment means is employed in addition to the hinged cover.

5. A device as defined in claim 1 wherein the attachment comprises a bowl-shaped float member adapted to rest on the surface of the liquid in the tank and to support the hollow float.

6. The attachment as defined in claim 4 wherein the secondary attachment comprises a bowl-shaped member adapted to rest on the surface of the liquid and serving to increase the effective diameter of the float as a whole.

7. A device as defined in claim 1 wherein the attachment comprises primary and secondary float means each comprising an inner body portion of foam plastic and an outer liquid impervious skin portion.

* * * * *